(12) United States Patent
Okada et al.

(10) Patent No.: US 6,280,556 B1
(45) Date of Patent: Aug. 28, 2001

(54) APPARATUS AND METHOD FOR ALIGNING AND SPLICING STRIP MEMBERS

(75) Inventors: Noboru Okada; Haruhisa Hasegawa, both of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/331,573

(22) PCT Filed: Nov. 10, 1998

(86) PCT No.: PCT/JP98/05052

§ 371 Date: Jun. 28, 1999

§ 102(e) Date: Jun. 28, 1999

(87) PCT Pub. No.: WO99/24244

PCT Pub. Date: May 20, 1999

(30) Foreign Application Priority Data

Nov. 10, 1997 (JP) .................................................... 9-306977

(51) Int. Cl.[7] .................................................. B32B 31/10
(52) U.S. Cl. .................. 156/264; 156/304.5; 156/304.1; 156/507
(58) Field of Search ................................ 156/264, 304.1, 156/304.5, 502, 507

(56) References Cited

U.S. PATENT DOCUMENTS

| 3,325,328 | * | 6/1967 | Henley | 156/157 |
| 3,859,152 | * | 1/1975 | Brey et al. | 156/264 X |
| 3,933,565 | * | 1/1976 | Printz et al. | 156/502 X |
| 4,025,384 | * | 5/1977 | Shiozaki et al. | 156/502 |
| 5,131,971 | * | 7/1992 | Elia et al. | 156/264 X |
| 5,145,542 | * | 9/1992 | Tanaka et al. | 156/159 |
| 5,514,233 | * | 5/1996 | Miyamoto | 156/159 X |
| 5,749,998 | * | 5/1998 | Skinner | 156/264 X |

* cited by examiner

Primary Examiner—Mark A. Osele
(74) Attorney, Agent, or Firm—Arent Fox Kintner Plotkin & Kahn, PLLC (57) ABSTRACT

An apparatus for forming a desired belt member in such a manner that a continuous strip material is cut into a plurality of strips each having a predetermined length while the strip material is fed in a direction traversing a conveyer and the cut strips are aligned and spliced on the conveyer while moving the conveyer intermittently. The apparatus is provided with a first guide having a bottom plate for supporting the rear edge of the strip material along a feeding path through which the strip material is fed to a conveyer and a side plate for regulating the rear edge position of the strip material, a second guide having a side plate for regulating the front edge position of the strip material and capable of moving vertically and a splicing press capable of moving vertically along the second guide.

18 Claims, 5 Drawing Sheets

APPARATUS AND METHOD FOR ALIGNING AND SPLICING STRIP MEMBERS

TECHNICAL FIELD

The present invention relates to a strip material aligning and splicing apparatus and method, and more particularly to such apparatus and method that are used to efficiently align and splice on a conveyer a plurality of strips each obtained by cutting a continuous strip material to a predetermined length.

BACKGROUND OF THE INVENTION

For example, the belt layer of a pneumatic radial tire is produced in such a manner that a band-shaped body of a large width comprising a number of aligned reinforcing cords impregnated with unvulcanized rubber is bias-cut at a predetermined angle and width, the bias-cut band strips are spliced side to side thereby forming an elongate belt material and the elongate belt material is wound around a cell so as to be temporarily stocked. This belt material is drawn out from the cell at the time of forming the belt layer and is cut along the longitudinal direction of the reinforcing cords to a length corresponding to the peripheral length of the belt layer thereby obtaining a belt material for one tire.

However, the width and length of the belt material for one tire differ depending on the size of the tire, and the cord angle also differs depending on the specifications of the tire so that it is necessary to stock the belt materials produced in the above-described manner as those which have different sizes with every tire specifications. Accordingly, in order to prepare quite a variety of kinds of belt materials as intermediate members, there has hitherto been a problem that a wide space for stocking the tire materials is required.

As a countermeasure against the above-described problem, the present inventor once proposed a method of forming a belt material for one tire wherein a strip material of a small width comprising a plurality of reinforcing cords coated with unvulcanized rubber is fed to a conveyer, then the strip material is cut at a predetermined cutting angle to obtain a plurality of strips each having a predetermined length and a predetermined integer number of the cut strips are spliced to thereby obtain a belt material for one tire, so that the troublesomeness of having to prepare a variety of kinds of belt materials is eliminated. However, since the width of the strip material is as small as less than 60 mm, the lateral rigidity of the strip material itself is low and therefore, when the strip material is fed to the conveyer in the above-described manner, it becomes displaced or deformed so that it is difficult to accurately align and splice the strips after cutting the strip material. Accordingly, there has hitherto been the problem that the productivity of the belt material is greatly influenced by whether or not the splicing accuracy or splicing efficiency is favorable.

An object of the present invention is to provide a strip material aligning and splicing apparatus and method wherein strips each cut from a continuous strip material to a predetermined length can be aligned and spliced accurately and efficiently.

DISCLOSURE OF THE INVENTION

The strip material aligning and splicing apparatus according to one embodiment of the present invention is for achieving the above-described object functions such that a continuous strip material is cut to a plurality of strips each having a predetermined length while intermittently feeding the strip material in a direction traversing a conveyer and then the cut strips are aligned and spliced in sequence in a direction in which the strips are conveyed while intermittently moving the conveyer to thereby form a belt material and the apparatus is characterized by the provision of a first guide having a bottom plate for supporting the rear edge of the strip material along a feeding path through which the strip material is fed to the conveyer and a side plate for regulating the rear end position of the strip material, a second guide capable of moving vertically and having a side plate for regulating the front edge position of the strip material and a splicing press capable of moving vertically along the second guide.

Further, the strip material aligning and splicing method according to one embodiment of the present invention is characterized in that the width of the feeding path regulated by the first and second guides is set substantially identical with that of the strip material and the strips cut from the strip material are aligned along the second guide by using the above-described strip material aligning and splicing apparatus.

Thus, due to the provision of the first guide for guiding the rear edge of the continuous strip material, the vertically movable second guide for guiding the front edge of the strip material and the splicing press movable vertically along the second guide, the strip material can be carried correctly onto the conveyer without getting displaced or bent while it is guided by the first and second guides, the strips cut from the strip material can be aligned in sequence in the conveying direction and can be pressed and spliced to the preceding strips. Accordingly, the strips are aligned and spliced accurately and efficiently.

The strip material aligning and splicing apparatus according to another embodiment of the present invention is for achieving the above-described object functions such that a continuous strip material is cut into a plurality of strips each having a predetermined length while the strip material is intermittently fed in a direction traversing a conveyer and then the strips are aligned and spliced in sequence in a direction in which the strips are conveyed while the conveyer is moved intermittently to thereby form a belt material and the apparatus is characterized by the provision of a first guide having at least a bottom plate for supporting the rear edge of the strip material along a feeding path through which the strip material is fed, a second guide capable of moving vertically and having a side plate for regulating the front edge position of the strip material and a splicing press capable of moving vertically along the second guide, the first guide being capable of moving forward and backward in the direction normal to the side surface thereof.

Further, the strip material aligning and splicing method according to another embodiment of the present invention is characterized in that the width of the feeding path regulated by the first and second guides is set larger than that of the strip material by using the above described aligning and splicing apparatus and upon completion of feeding the strip material, the first guide is caused to advance toward the second guide to thereby align the strip material along the second guide.

That is, in order to minimize the frictional resistance between the side plates of the first and second guides, and the strip material, the width of the feeding path can be set larger than the total width of the strip material. In this case, the first guide is moved to the second guide after feeding the strip material so that the strip material is applied to the inner side surface of the second guide and aligned due to the frictional resistance between the bottom plate of first the guide plate and the strip material or due to contact of the strip material with the side plate attached to the first guide and then the aligned strip material is pressure-spliced to the preceding strip by the splicing press. Therefore, it is possible to increase the accuracy of splicing the strips.

BRIEF DESCRIPTION OF THE DRAWINGS

(It should be noted that in FIGS. 2 through 4, the conveyer and the splicing apparatus are depicted to be arranged to set up a cutting angle θ=90° for facilitating the understanding of the arrangement while they are originally arranged to set up a cutting angle θ=15–45°).

Figure 5:
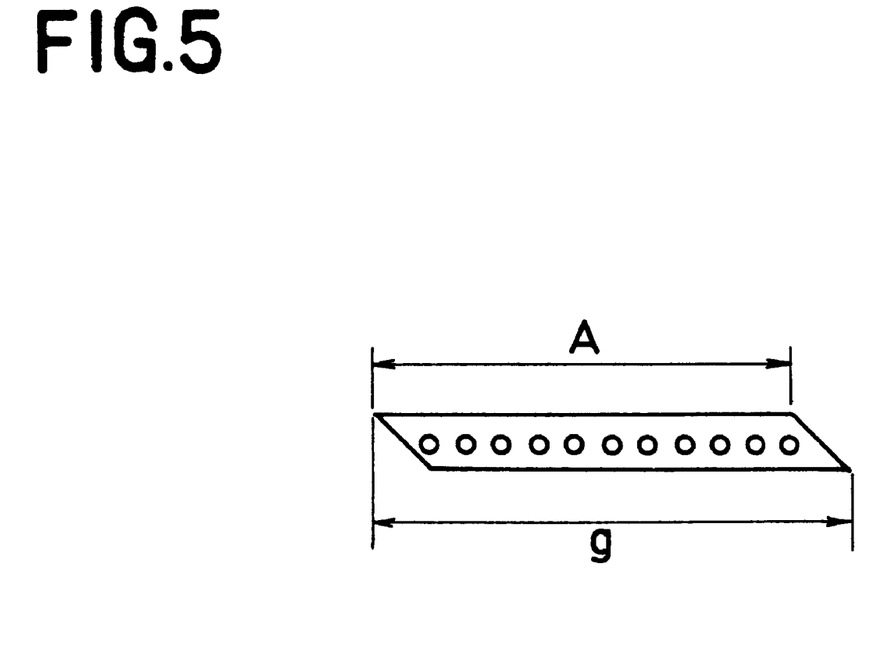

FIG. 5 is a sectional view of a strip material. Best Mode for Carrying Out the Invention In FIG. 1, reference numeral 1 designates a creel stand for feeding a plurality of reinforcing cords f of steel cords, reference numeral 2 designates a rubber coating unit for coating the reinforcing cords f with rubber to produce a strip material S, reference numeral 3 designates a draw-out unit for drawing out the strip material S, reference numeral 4 designates a festooner for keeping the strip material S temporarily, reference numeral 5 designates a predetermined length feeding unit for intermittently feeding the strip material S, reference numeral 6 designates a cutting unit for cutting the strip material S by a predetermined length and at a predetermined angle, reference numeral 7 designates a conveyer which receives a number of strips S' each cut to a predetermined length and intermittently feeds them to a forming drum F as an aligned and spliced belt material, and reference numeral 10 designates a aligning and splicing apparatus for aligning and splicing the strips S' on the conveyer 7.

Figure 1:
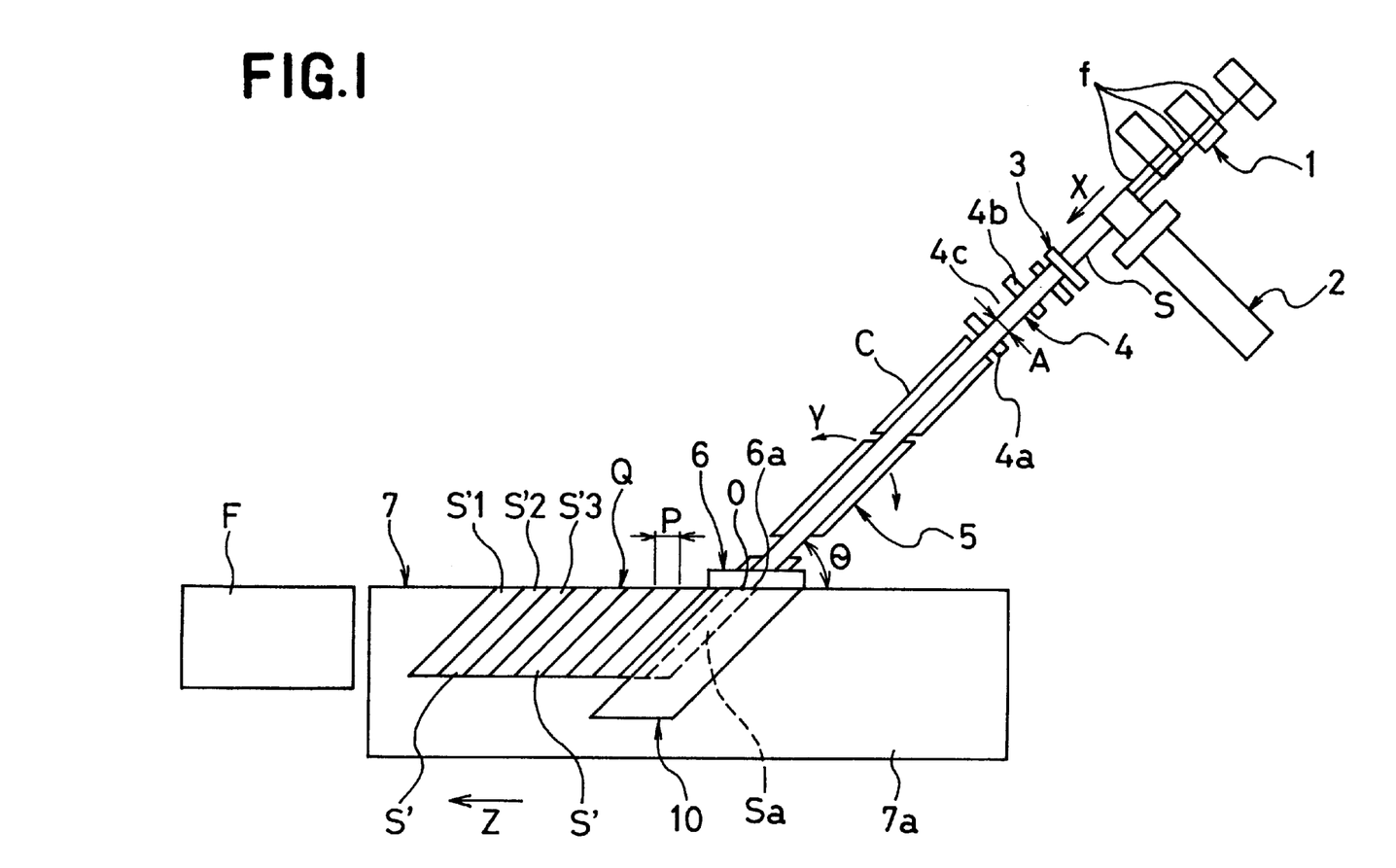
FIG. 1 is a schematic illustrative view of a belt material forming apparatus for a pneumatic radial tire with the view showing one example of using a strip material aligning and splicing apparatus according to the present invention.

The creel stand 1 mounts thereon a plurality of reels each having the reinforcing cord f wound therearound. The rubber coating unit 2 aligns the plurality of reinforcing cords f drawn off from the creel stand 1 parallel to one another at a predetermined pitch and extrudes unvulcanized rubber to the aligned cords f to thereby coat them with the rubber so that a strip material S of a predetermined width which is parallelogrammic in section and which has tapered surfaces on both cross directional ends thereof can be formed in sequence. The width A of the strip material S may be in the order of 5–60 mm or preferably in the order of 10–30 mm. To the coating unit 2 there is connected the draw-out unit 3.

The draw-out unit 3 pays out the reinforcing cords f in sequence from the creel stand 1 and after causing the reinforcing cords f to be formed into the strip material S by the rubber coating unit 2, draws it out in sequence toward the direction of the arrow X. To this draw-out unit 3 there is connected the festooner 4.

The festooner 4 is arranged to absorb the difference between the sequential draw-out speed of the draw-out unit 3 and the intermittent feeding speed of the predetermined length feeding unit 5. The strip material S is suspended in a space 4c formed between rollers 4a and 4b of the festooner 4 and kept standing in a loop shape, rotating speed of the rollers 4a and 4b being controlled on the basis of the amount of the strip material S kept standing. The predetermined length feeding unit 5 is connected to this festooner 4 through a free roller conveyer or a table C.

The predetermined length feeding unit 5 is constructed such that it intermittently conveys the strip material S every predetermined length to the width of the belt. Further, the predetermined length feeding unit 5 is so constructed as to swing toward both sides thereof as shown by the arrows Y about a position O on a cutting line 6a on the side of the cutting unit 6 and the angle at which the strip material S is fed to the conveyer 7 can be adjusted. Further, the unit 5 can be adjusted of its intermittent feeding length.

The cutting unit 6 cuts the strip material S conveyed to a side of the conveyer 7 by the predetermined length feeding unit 5 for every predetermined length into strips S' in sequence at a predetermined cutting angle θ with respect to the conveying direction. The strip material S is cut in a direction parallel to the moving direction of the conveyer 7. This cutting angle θ is so determined that if it is assumed that the peripheral length of the belt layer of a tire be L, the width of the strip material S be A and the number of strips S' forming the belt layer per tire be N, the equation of θ=sin$^{-1}$ (N×A/L) is established wherein N is an integer.

For example, assuming that the peripheral length L of the belt layer for each tire be 1800 mm and the width A of the strip material S be 10 mm, the number N of the strips will be a total of 73 with the cutting angle θ of 23.9°. Further, assuming that the peripheral length L of the belt layer for each tire be 1800 mm and the width A of the strip material S be 20 mm, the number N of the strips will be a total of 37 with the cutting angle θ of 24.3°. Where the belt specifications have been changed to comply with the tire specifications, the same setting is made. Accordingly, it becomes possible to form a belt material for the belt layer of a tire having a peripheral length L by splicing an integer number of the strips S'. The cutting angle θ may be in the order of 15–45° or preferably in the order of 20–30°.

Figure 2:
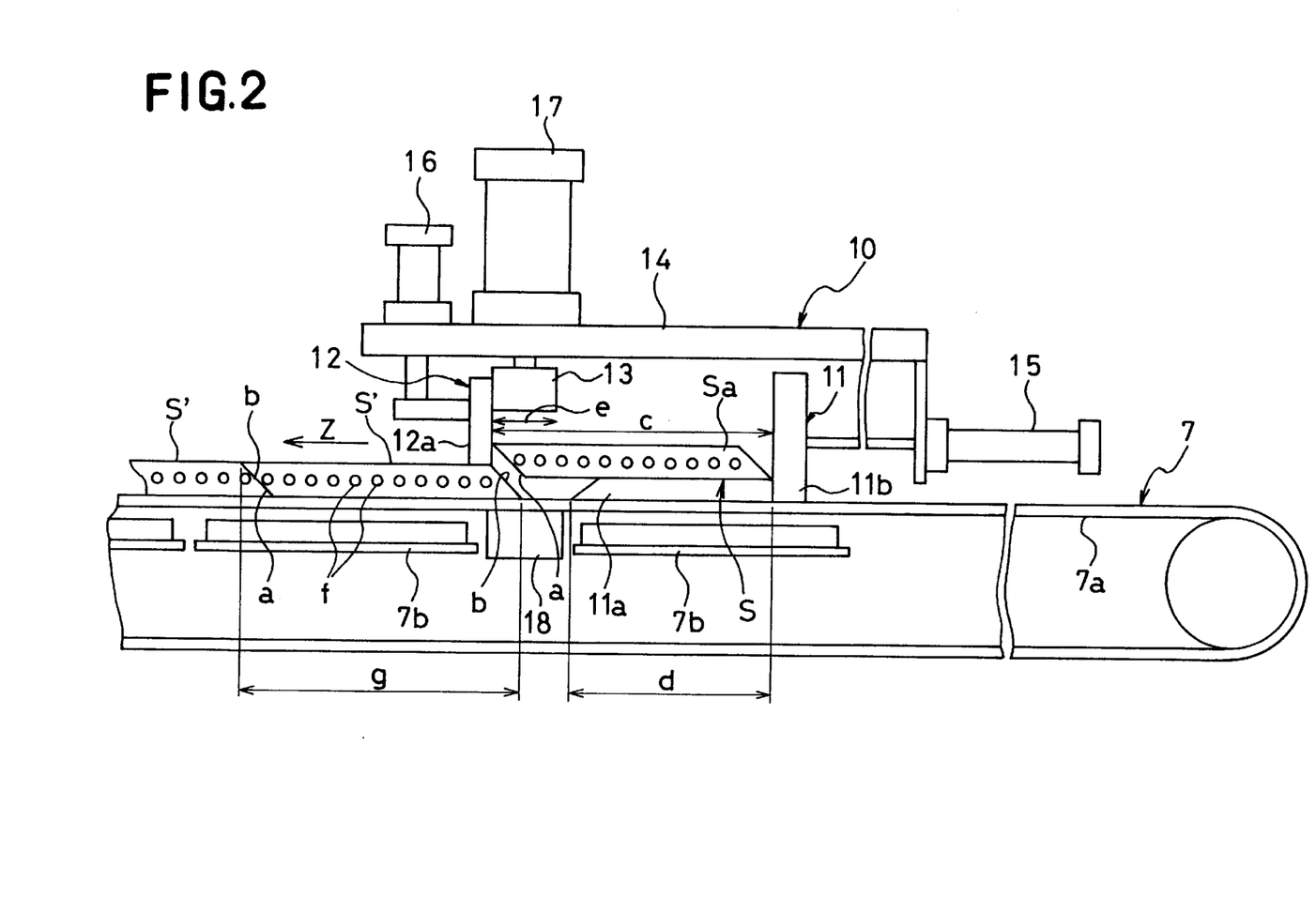
FIG. 2 is a diagram showing in detail a strip material aligning and splicing apparatus according to one embodiment of the present invention.

The conveyer 7 is so constructed that it is intermittently moved in a alternative fashion in synchronism with the predetermined length feeding unit 5 and adapted to intermittently feed the strips S' toward the belt forming drum F every predetermined length. The feeding amount P of the strips corresponds to the length of the cut surface of each of the strips S' and satisfies the equation of P=A/sin θ. As shown in FIG. 2, there are provided inside a conveyer belt 7a annularly passed between driving and rotating devices a plurality of magnets 7b which magnetically hold the spliced strips S' onto the conveyer belt 7a. Above the conveyer 7 there is arranged an aligning and splicing apparatus 10.

As shown in FIG. 2, the aligning and splicing apparatus 10 is arranged along a feeding path for feeding the strip material S to the conveyer 7 crosswise and is provided with a first guide 11 having a bottom plate 11a for supporting the rear edge of the strip material S and a side plate 11b for regulating the rear edge position of the strip S and a second guide 12 having a side plate 12a for regulating the position of the front edge of the strip material S. The first guide 11 is capable of moving forward and backward in a direction normal to the first guide side surface by the operation of a cylinder 15 attached to a support frame 14. The second guide 12 is capable of moving vertically by the operation of a cylinder 16 attached to the support frame 14.

Between the first guide 11 and the second guide 12 there is arranged a splicing press 13 for pressure-splicing the strips S' together. The splicing press 13 is made movable vertically along the side plate 12a of the second guide 12 by the operation of a cylinder 17 attached to the support frame 14. Reference numeral 18 designates a press receiving table arranged inside the belt conveyer 7a.

With respect to the first and second guides 11 and 12 and the splicing press 13, the distance c between the side plates 11b and 12a may be made the same as, or somewhat larger than, the total width g of the strip material S and the total length (d+e) of the width d of the bottom plate 11a and the width e of the splicing press 13 may well be the same as, or somewhat smaller than, the total width g of the strip material S.

The support frame 14 swings about the position O on the cutting line 6a on the side of the cutting unit 6 when the cutting angle θ of the cutting unit 6 is changed by swinging the unit 5 so that the direction of extension of the first and second guides 11 and 12 traversing the conveying direction Z, the direction of extension of the splicing press 13 and the feeding direction of the predetermined length feeding unit 5 always coincide with one another.

With the apparatus having the above-described structure, a plurality of reinforcing cords f are continuously drawn out by the draw-out unit 3 from the reels supported by the creel stand 1 and coated with unvulcanized rubber by the rubber coating unit 2 to thereby form the strip material S of a predetermined width which is parallelogrammic in section. The strip material S thus formed with the predetermined width is fed to the festooner 4 from the draw-out unit 3 where it is temporarily kept staying and then carried to the conveyer 7 intermittently every predetermined length by the predetermined length feeding unit 5. The predetermined length feeding unit 5 carries the strip material S to the conveyer 7 from the cutting position 6a of the cutting unit 6 by a predetermined length corresponding to the width of the belt.

The tip end portion Sa of the strip material S fed from the predetermined length feeding unit 5 to the conveyer 7 moves on the bottom plate 11a without causing displacement or deformation of bending while it is guided by the side plates 11b and 12a of the first and second guides 11 and 12.

Then, the tip end portion Sa of the strip material S is cut to a predetermined length by the cutting unit 6 at a cutting angle θ. Upon completion of cutting, the splicing press 13 is lowered to press the front edge in the conveying direction (the left-side end) of a cut strip S'1 onto the conveyer belt 7a and causes it to be clamped between the splicing press 13 and the conveyer belt 7a. The first guide 11 moves back in a direction normal to the side surface thereof and places the strip S'1 on the conveyer belt 7a so that the strip S'1 on the conveyer belt 7a is magnetically held on the conveyer belt 7a by means of the magnets 7b.

When the strip S'1 has been placed on the conveyer belt 7a, the splicing press 13 elevates to be on standby at a standby position shown in FIG. 2 while the second guide 12 elevates to an upward standby position.

Next, the conveyer 7 operates to convey the strip S'1 thereon to the forming drum F by a feeding amount corresponding to the length P of the cut surface inclined at a cutting angle θ. After conveying the strip S'1, the second guide 12 lowers to the guide position shown in FIG. 2 while the first guide 11 advances to the guide position shown in FIG. 2 in the direction normal to the side surface thereof.

When both of the guides 11 and 12 have moved to their guide positions, respectively, the tip end portion of the strip material S is conveyed again from its cutting position 6a to the conveyer 7 by the predetermined length by the predetermined length feeding unit 5 as it is guided by the first and second guides 11 and 12 and the tip end portion of the strip material S is then cut into a strip S'2 by the cutting unit 6.

Next, the splicing press 13 is lowered to press the front edge of the progressing strip S'2. In this case, since the preceding strip S'1 is being conveyed on the conveyer belt 7a to the forming drum F by a length equal to the length of the cut surface thereof, the front end surface a in the conveying direction of the strip S'2 which is parallelogramic in section is butted against the rear end surface b in the conveying direction of the preceding strip S'1 so that both strips are pressure-spliced to each other.

After the two strips S'1 and S'2 have been spliced together, the first guide 11 keeps its guide position while the splicing press 13 and the second guide 12 elevate to their standby positions so as to convey the spliced strips S'1 and S'2 on the conveyer belt 7a to the forming drum F by the feeding amount corresponding to the length of the cut surface of each of them. When the second guide 12 has moved to its guide position, the strip material S is fed between the first and second guides 11 and 12 by the predetermined length feeding unit 5. Then, the above-described predetermined length cutting, bonding and predetermined length feeding steps are repeated. The strips are aligned and spliced in sequence on the conveyer belt 7a of the conveyer 7 in the conveying direction whereby a belt material Q comprising an integer number of strips S'1, S'2, S'3, . . . of the same width and having a length equal to the peripheral length L of the belt layer of a tire is formed.

The belt material Q spliced to be allotted to one tire is supplied per se to the forming drum F, wound around the outer periphery of the drum F and both the front and rear ends thereof are spliced to form an annular endless belt.

Thus, according to the present invention, the tip end portion Sa of the strip material S is carried to the conveyer 7 by the first guide 11 having the bottom plate 11a for supporting the rear edge of the continuous strip material S and the side plate 11b for regulating the position of the rear end of the strip material S and the second guide 12 having the side plate 12a for regulating the front edge of the strip material S and on the conveyer 7 the sides of the strips S' each cut to the predetermined length by the cutting unit 6 can be spliced together by the splicing press 13. Therefore, the strip material S does not get displaced or deformed when it is fed onto the conveyer 7 and it is possible to quickly splice the strips while positioning them accurately, quickly and easily. Accordingly, the accurate alignment and effective splicing of the strips are made possible.

In the above-described mode of carrying out the present invention, the first guide 11 moves back when the first strip S'1 is placed on the conveyer belt 7a and thereafter it keeps its guide position. However, where the spliced strips slip on the conveyer belt 7a, the spliced strips may be magnetically held on the conveyer belt 7a by causing the first guide 11 to move back as in the case of the first strip S'1.

Figure 3:
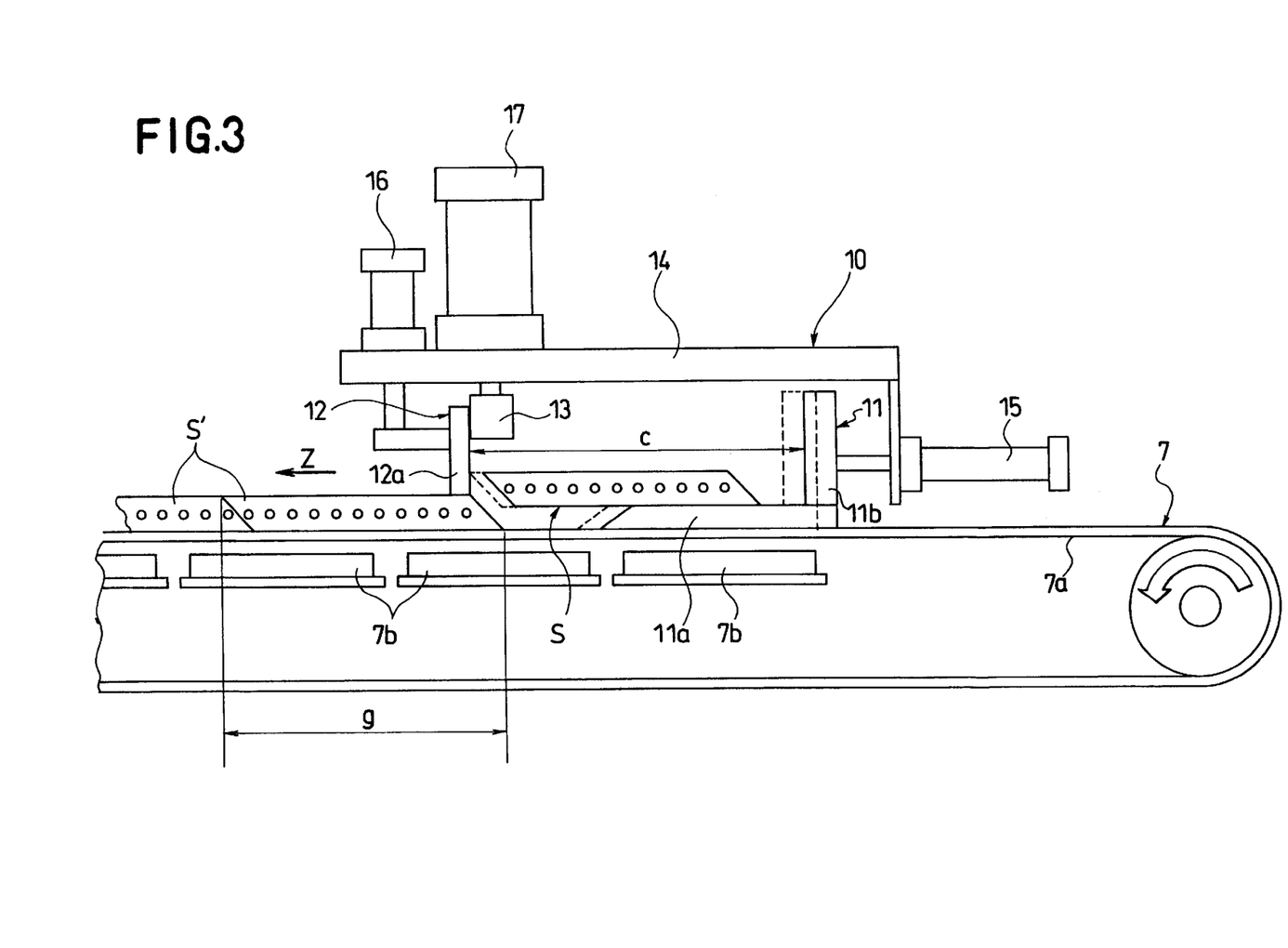
FIG. 3 is a diagram showing in detail a strip material aligning and splicing apparatus according to another embodiment of the present invention.
Figure 4:
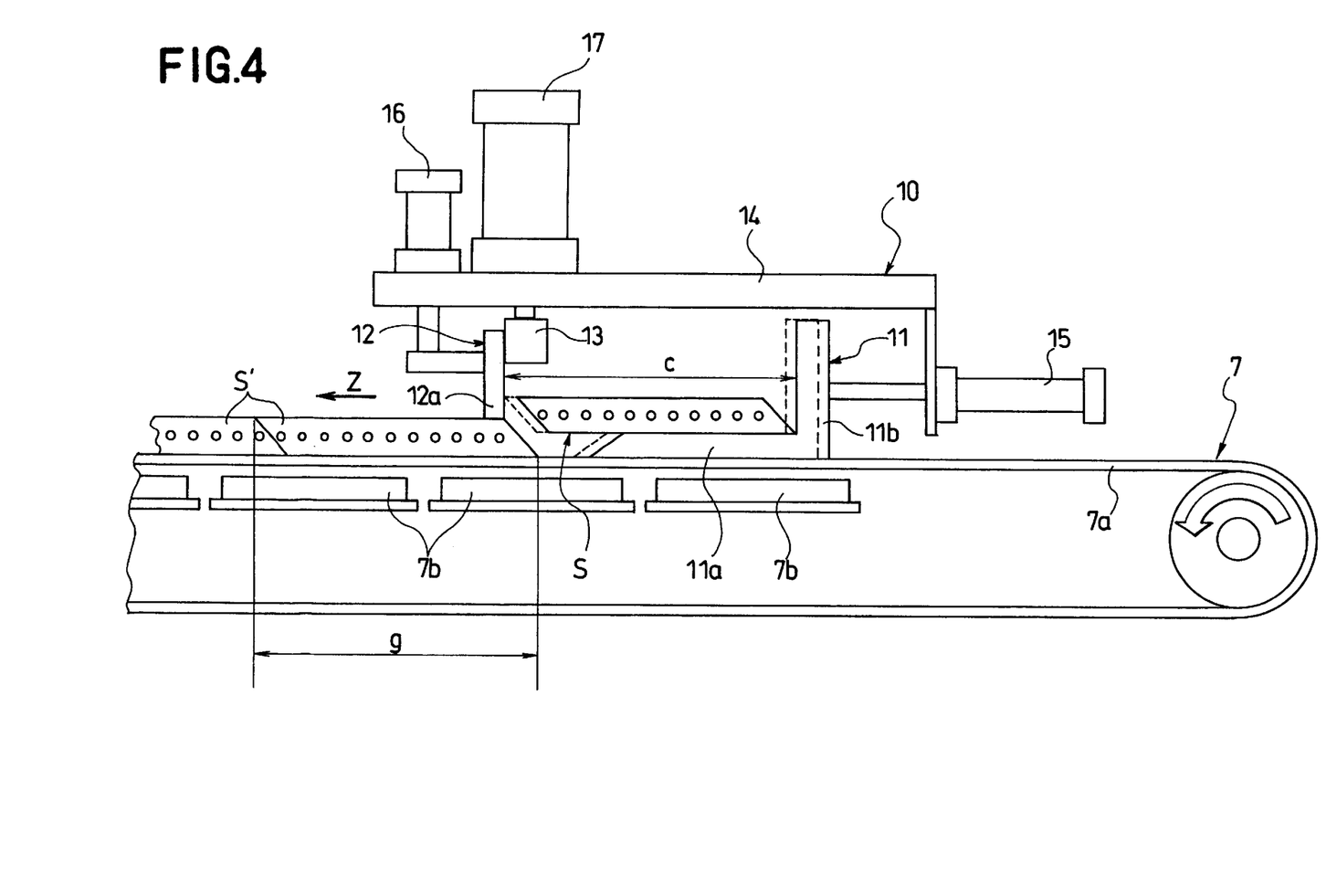
FIG. 4 is a diagram showing in detail a strip material aligning and splicing apparatus according to still another embodiment of the present invention.

Next, another mode of carrying out the present invention will be described with reference to FIGS. 3 and 4. It should be noted in this connection that only the points differing from the first-described mode are described and parts identical with those in FIG. 2 are designated by the same reference numerals while the detailed description of those parts are omitted.

The mode of carrying out the invention shown in FIG. 2 is a case in which the width of the feeding path for the strip material S expressed by the distance c between the side plate 11b of the first guide 11 and the side plate 12a of the second guide 12 is made substantially the same as the total width g of the strip material S. However, where the width of the feeding path for the strip material S is set to be substantially the same as the total width g of the strip material S, there sometimes arises the problem that the strip material S is bent and deformed along the surface thereof due to a frictional resistance between the first and second guides 11 and 12, and the strip material S when the rigidity of the reinforcing cord f of the strip material S is low.

Therefore, where the carrying in of the strip material S is hindered due to a large sliding frictional resistance between the side plate 11b of the first guide 11 and the side plate 12a of the second guide 12, and the strip material S, the gap between the side plates 11b and 12a is set sufficiently larger than the total width g of the strip material S. In this case, in order to increase the splicing accuracy, after carrying in the strip material S the first guide 11 is moved toward the second guide 12. After aligning the strip material S by applying it to the inner side surface of the second guide 12, it is pressure-spliced to the previously fed strip S' by the splicing press 13.

More concretely, as shown in Figs, 3 and 4, the strip material S to be fed between the side plate 11b of the first guide 11 and the side plate 12a of the second guide 12 becomes unstable with respect to its position in the cross direction thereof although the frictional resistance between the side plates 11b and 12a is reduced. Therefore, as shown in FIG. 3, by moving the first guide 11 toward the second guide 12 after feeding the strip material S, the strip material S is aligned along the second guide 12 by making use of the frictional resistance between the bottom plate 11a of the first guide 11 and the strip material S. Alternatively, as shown in FIG. 4, the first guide 11 is moved toward the second guide 12 after feeding the strip material S so that the strip material S is brought into contact with the side plate 11b of the first guide 11 to thereby align the strip material S along the second guide 12.

As described above, by making the feeding path for the strip material S sufficiently larger than the total width g of the strip material S, it is possible to prevent the strip material S from becoming deformed even when the rigidity of the strip material S is low. Furthermore, since the strip material S is aligned along the second guide 12 by causing the first guide 11 to move forward, it is possible to maintain the splicing accuracy at a high level.

According to the present invention, the timing of cutting the strip material S can be properly changed according to the rigidity of the reinforcing cord f of the strip material S. Where the rigidity of the strip material S is high, the strip material S aligned along the second guide 12 as described above may be cut to a strip S' of a predetermined length and then the strip S' thus cut may be spliced with respect to the preceding strip S' without any problem.

On the other hand, where the rigidity of the strip material S is low, if the strip material S is movable at the time of its cutting, the strip material S displaces due to its being subjected to a shearing force so that the splicing accuracy lowers. Therefore, where the rigidity of the strip material S is low, it is preferable that the strip material S aligned along the second guide 12 be spliced with the preceding strip S' by the splicing press 13 and then the strip material S be cut to a strip S' of a predetermined length.

Thus, by cutting the strip material S in a state in which the strip material S is pressed by the splicing press 13 or spliced to the preceding strip S', it is possible to manufacture a belt material of stabilized quality even when the rigidity of the strip material S is low.

Industrial Applicability

The present invention having the above-described excellent effects can be preferably made use of as an aligning and splicing apparatus and method for forming a pneumatic radial tire belt material but it is not always limited thereto and it can be effectively made use of for any kind of aligning and splicing apparatus and method for forming a predetermined belt material by splicing the sides of strips each having a small width and cut to a predetermined length.

What is claimed is:

1. A strip material aligning and splicing apparatus for forming a desired belt material in such a manner that a continuous strip material is sequentially cut into a plurality of strips each having a predetermined length while the strip material is intermittently fed in a direction traversing a conveyer and cut strips are sequentially aligned and spliced in the conveying direction while intermittently moving the conveyer, said apparatus being provided, along a feeding path through which said strip material is carried to said conveyer, with a first guide having a bottom plate for supporting a rear edge of said strip material and a side plate for regulating the position of said rear edge, a vertically movable second guide having a side plate for regulating the position of a front edge of said strip material and a splicing press capable of moving vertically along said second guide.

2. The strip material aligning and splicing apparatus as claimed in claim 1, wherein said first guide is made movable forward and backward in a direction normal to the side guide surface thereof.

3. The strip material aligning and splicing apparatus as claimed in claim 1 or 2, wherein said strip material comprises a plurality of steel cords coated with unvulcanized rubber and having a predetermined width.

4. The strip material aligning and splicing apparatus as claimed in claim 3, wherein the apparatus is provided with a plurality of magnets which magnetically hold said strips onto said conveyer.

5. The strip material aligning and splicing apparatus as claimed in claim 1 or 2, wherein said strip material is parallelogrammic in section and has tapered surfaces on both end portions in the width direction thereof.

6. The strip material aligning and splicing apparatus as claimed in claim 1 or 2, wherein said belt material is used as a belt member for a pneumatic radial tire.

7. A strip material aligning and splicing method for forming a desired belt material comprising the steps of cutting a continuous strip material into a plurality of strips each having a predetermined length while intermittently feeding a continuous strip material in a direction traversing a conveyer and aligning and splicing the cut strips in sequence on the conveyer while intermittently moving said conveyer to thereby form the desired belt material, said method making use of an aligning and splicing apparatus comprising a first guide having a bottom plate for supporting a rear edge of said strip material and a side plate for regulating the position of said rear edge of said strip material and arranged along a feeding path through which said strip material is fed to said conveyer, a vertically movable second guide having a side plate for regulating the position of a front edge of said strip material and a splicing press movable vertically along said second guide, and wherein the width of said feeding path regulated by said first and second guides is set substantially the same as the width of said strip material thereby aligning said strip material along said second guide.

8. The strip material aligning and splicing method as claimed in claim 7, wherein after cutting said strip material aligned along said second guide into a strip of a predetermined length, the cut strip is spliced to a preceding strip by said splicing press.

9. The strip material aligning and splicing method as claimed in claim 7, wherein after splicing said strip material aligned along said second guide to a preceding strip by said splicing press, the spliced strip material is cut into a strip of a predetermined length.

10. A strip material aligning and splicing apparatus for forming a desired belt material in such a manner that a continuous strip material is sequentially cut into a plurality of strips each having a predetermined length while the strip material is intermittently fed in a direction traversing a conveyer and the cut strips are sequentially aligned and spliced on the conveyer while the conveyer is moved intermittently, said apparatus being provided, along a feeding path through which said strip material is carried to said conveyer, with a first guide having at least a bottom plate for supporting a rear edge of said strip material, a vertically movable second guide having a side plate for regulating the position of a front edge of said strip material and a splicing press capable of moving vertically along said second guide, said first guide being made movable forward and backward in a direction normal to the side guide surface thereof.

11. The strip material aligning and splicing apparatus as claimed in claim 10, wherein said first guide is provided with a side plate for regulating a rear end position of said strip material.

12. The strip material aligning and splicing apparatus as claimed in claim 10 or 11, wherein said strip material comprises a plurality of steel cords coated with unvulcanized rubber and having a predetermined width.

13. The strip material aligning and splicing apparatus as claimed in claim 12, wherein said apparatus is provided with a plurality of magnets for magnetically holding said strips to said conveyer.

14. The strip material aligning and splicing apparatus as claimed in claim 10 or 11, wherein said strip material is parallelogrammic in section and has tapered surfaces on both end portions in the width direction thereof.

15. The strip material aligning and splicing apparatus as claimed in claim 10 or 11, wherein said belt material is used as a belt member for a pneumatic radial tire.

16. A strip material aligning and splicing method for forming a desired belt material comprising the steps of cutting a continuous strip material into a plurality of strips each having a predetermined length while intermittently feeding a continuous strip material in a direction traversing a conveyer and aligning and splicing the cut strips in sequence on the conveyer while intermittently moving said conveyer to thereby form the desired belt material, said method making use of an aligning and splicing apparatus comprising a first guide having at least a bottom plate for supporting a rear edge of said strip material and arranged along a feeding path through which said strip material is fed to said conveyer, a vertically movable second guide having a side plate for regulating the position of a front edge of said strip material and a splicing press movable vertically along said second guide, said first guide being made movable forward and backward in a direction normal to the side guide surface thereof, and wherein the width of said feeding path regulated by said first and second guides is set larger than the width of said strip material and after completion of feeding of said strip material, said first guide is caused to advance toward said second guide thereby aligning said strip material along said second guide.

17. The strip material aligning and splicing method as claimed in claim 16, wherein after cutting said strip material aligned along said second guide into a strip of a predetermined length, the cut strip is spliced to a preceding strip by said splicing press.

18. The strip material aligning and splicing method as claimed in claim 16, wherein after splicing said strip material aligned along said second guide to a preceding strip by said splicing press, the spliced strip material is cut into a strip of a predetermined length.

* * * * *